UNITED STATES PATENT OFFICE.

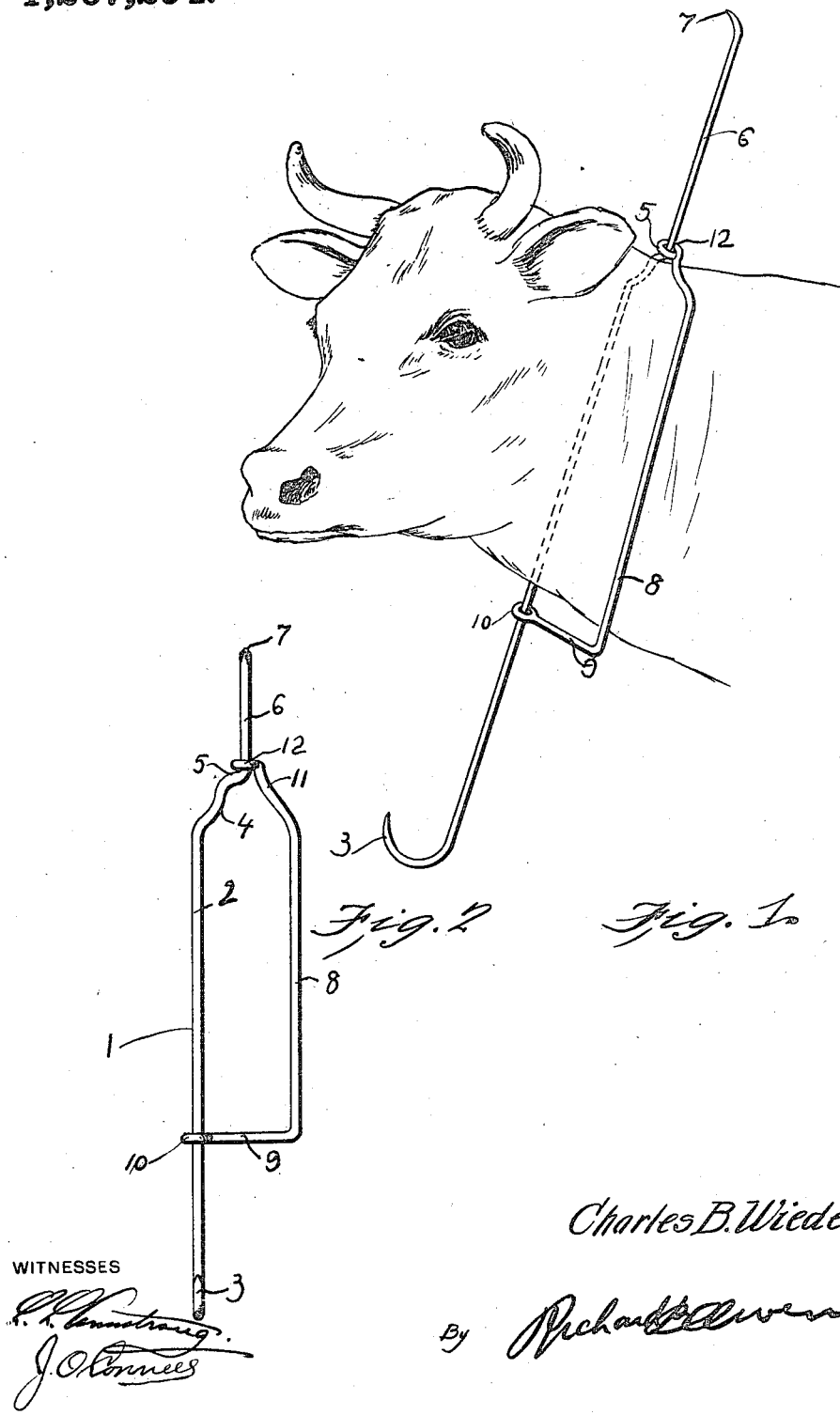

CHARLES B. WIEDERHOLT, OF HASTINGS, MINNESOTA.

CATTLE-YOKE.

1,267,294.    Specification of Letters Patent.    Patented May 21, 1918.

Application filed October 15, 1917. Serial No. 196,676.

*To all whom it may concern:*

Be it known that I, CHARLES B. WIEDERHOLT, a citizen of the United States, residing at Hastings, in the county of Dakota and State of Minnesota, have invented certain new and useful Improvements in Cattle-Yokes, of which the following is a specification.

This invention relates to certain new and useful improvements in cattle yokes.

The primary object of the invention is to provide a cattle yoke which can be quickly and easily arranged around the neck of an animal and is of such construction as to prevent the animal escaping from a closure as by jumping or forcing its way through the surrounding fence.

Another object of the invention resides in the provision of a yoke of this character which includes a neck piece and a rod loosely connected therewith. The ends of this rod are curved to provide hooks adapted to engage the fence as the animal attempts to jump over or crawl through the same.

A further object of the invention resides in the provision of a yoke of the above general character, which is extremely simple in construction and comparatively inexpensive thereby enabling the device to be manufactured and placed on the market at a minimum cost.

Other objects of the invention as well as the construction and arrangement of the parts thereof will be more readily understood from the following description and accompanying drawings, in which drawings, Figure 1 is a perspective view of the yoke in applied position, and Fig. 2 is a front view of the same.

In these drawings, wherein I have shown a preferred embodiment, 1 indicates a rod which is preferably constructed of wire and is formed with a straight shank portion 2. At the lower end, the shank portion terminates in a curved hook 3, and from the opposite end thereof the rod is extending inwardly and upwardly as at 4 and is then bent at right angles to provide a shoulder 5, which shoulder is disposed in a plane substantially at right angles to the straight shank portion. After forming this shoulder the rod is again bent at right angles to provide the upwardly extending portion 6 which is offset from the shank 2 and is in a plane substantially parallel therewith. The extremity of this portion 6 is curved as at 7 to provide a hook at the upper end of the rod.

Engaged with the rod is a suitable neck piece which is likewise constructed of wire and is formed with a straight portion 8, from the lower end of which the wire is extended at right angles to form an arm 9, said arm terminating in an eye 10 which embraces the straight shank 2 adjacent the hook 3. From the opposite end of the straight portion 8 of the neck piece the wire is extended inwardly and upwardly as at 11 and terminates in an eye 12 which is in a plane at right angles to the straight portion 8 and is disposed about the straight portion 6 of the rod above the shoulder 5. It is preferable to form the arm 9 of the neck yoke of such length that the lower end of the shank 2 will be spaced from the straight portion 8 of the neck than the upper end of the shank. When the yoke is disposed about the neck of an animal this arrangement prevents the rod from slipping through the eyes 10 and 12 of the neck piece.

In attaching the yoke to the animal the straight portion of the neck piece is placed against one side of the animal's neck with the eyes 10 and 12 extended across to the opposite side thereof. The upper end of the hook rod is then inserted through these eyes as shown in Fig. 1 and is arranged to fit the animal's neck in such a way that the curved or offset portion 4 will be positioned above the neck and will prevent downward slipping of the rod. With this yoke in position it will be clear that should the animal approach the fence and attempt to jump over or crawl through the same the hooked ends of the rod will engage the fence in such a manner as to frustrate the attempt.

It is to be understood that the construction described in the foregoing constitutes only a preferred embodiment of the invention and therefore I reserve the right to make such minor changes in the arrangement of parts as may be desirable, providing that the changes contemplated come within the scope of the appended claims and do not depart from the spirit of the invention.

I claim:—

1. A cattle yoke comprising a neck piece constructed from a piece of wire and formed with a straight shank portion, the lower end of the wire extending at right angles to the shank and terminating in an eye, the upper end of the wire extending inwardly and upwardly from said shank and terminating in an eye positioned above said first mentioned eye and to one side of the vertical axis thereof, a rod extending through said eyes, and hooks formed on either end of said rod.

2. A cattle yoke, including a neck piece comprising a straight shank portion having its lower end bent at right angles and terminating in an eye, the upper end of said shank being extended inwardly and upwardly above the same and terminating in a second eye lying in a parallel plane above said first eye, a rod passing through said eyes and having its opposite ends bent to provide hooks, an intermediate portion of said rod adjacent the upper end thereof being extended inwardly and upwardly and then at right angles to form a shoulder underlying the upper eye of said neck piece and serving to retain the device in position about the neck of an animal.

In testimony whereof I affix my signature in presence of two witnesses.

CHARLES B. WIEDERHOLT.

Witnesses:
GEO. WIEDERHOLT,
JOHN MILLER.